United States Patent Office 3,322,709
Patented May 30, 1967

3,322,709
COATING COMPOSITIONS
Irving P. Hammer, Nutley, N.J., assignor to Mobil Oil Corporation, a corporation of New York
No Drawing. Filed July 28, 1964, Ser. No. 385,764
16 Claims. (Cl. 260—28.5)

This invention relates to wax- and polymer-containing compositions for coating paper, cardboard, cartons and the like. More specifically, the invention is particularly directed to such compositions of exceptional seal strength characteristics.

In recent years, there has been a growing demand for wax coating compositions capable of use under a diversity of rigorous conditions. For example, margarine and butter cartons comprise paper carton stock coated with wax compositions fortified with one or more of a variety of materials. Such cartons should have substantial heat seal characteristics. They are also subjected to temperatures as low as about −40° F. (−40° C.) during use, temperature conditions at which many wax-coating compositions fail to adhere to the carton base material. Not only must the coating compositions meet such seal strength requirements, but they must be capable of application to a carton base at relatively low viscosity in order that conventional paper-coating equipment can be employed. And further stringency is placed on the compositions in that for aesthetic appeal, a substantial sales factor, they must have satisfactory initial gloss and satisfactory gloss retention.

Blends of one or more waxes and various olefin polymers and resins have been employed in an effort to satisfy the ever increasing demand for better coating compositions. Olefin polymers so used include homopolymers of ethylene, propylene, isobutylene and isoprene. Resins so used include polyterpenes, rosin and rosin-based derivatives. Such compositions, as have been formed to date, are noted for their toughness, scuff resistance and initial gloss. However, they have been significantly deficient in heat seal characteristics. As contemplated herein, "significant heat seal characteristics" denote a seal strength value of at least about 75 grams per inch obtained when two 25 pound glassine (a thin, dense translucent paper) strips, previously coated and heat sealed to one another at a temperature from about 200 to about 250° F. by a heat sealer (such as Model 12 AS, Sentinel Laboratory Heat Sealer, made by Packaging Industries), are delaminated on an Instron tester at 70° F. and at a rate of 5 inches per minute.

Significant heat seal characteristics are obtained with blends of wax and copolymers of ethylene and vinyl acetate or ethyl acrylate. However, concentrations of about 20 percent or more of copolymer in paraffin wax are required to achieve such characteristics. Unfortunately, the viscosities of such blends are so high that the blends cannot be used on coating machines now in general use. Further, gloss retention of such blends is poor. Substantial improvement of gloss retention of these blends can be realized with the addition of a microcrystalline wax, but with attendant disadvantageous increase in viscosity and reduction in seal strength.

It is, therefore, of particular value to provide hot melt coating compositions for carton stock and the like, having a combination of properties including the following:

(1) heal strength on glassine of at least about 75 grams per inch,
(2) effective seal strength on carton stock at low temperatures of about −40° F.,
(3) viscosity less than about 140 centistokes (or 650 Saybolt seconds) at 250° F.,
and
(4) gloss retention as shown by the extent of material exuding from a coated carton after storage at 105° F., for at least one week.

While a combination of properties such as the particular properties specified above are desired, it has generally been found that a component capable of imparting any one of the properties mentioned has an adverse effect on one or more of the other properties.

It is an object of the present invention, therefore, to provide a coating composition having a combination of properties defined by (1) through (4) above. Still another object is to provide a coating composition of exceptionally high seal strength characteristics. A more particular object is to provide coating compositions particularly well adapted for use on margarine and butter cartons. Still other objects will be apparent from the following description.

The compositions of this invention, through which the foregoing objects are achieved, comprise the following components proportioned so as to provide the desired properties:

(a) paraffin wax,
(b) microcrystalline wax,
(c) an interpolymer containing from about 70 to about 75 percent by weight of ethylene and from about 30 to about 25 percent by weight of vinyl acetate,
(d) a solid polymer of ethylene having an average molecular weight of from about 1,000 to about 10,000,
(e) a polyterpene resin, and (f) a polyisobutylene having an average molecular weight of from about 5,000 to about 15,000.

Particularly outstanding compositions are formed with a balance of proportions as indicated in the following tabulation:

| Component: | Percent, weight |
| --- | --- |
| (a) | 32–65.5 |
| (b) | 15–25 |
| (c) | 10–20 |
| (d) | 1–4 |
| (e) | 7.5–15 |
| (f) | 1–4. |

It is desirable to incorporate a minor amount, from about 10 to about 500 parts per million, of a petroleum-wax-soluble, phenolic antioxidant in the compositions. Particularly suitable is 2,6-di-tertiarybutyl-p-cresol.

Component (a) of the new compositions is a paraffin wax having a melting point from about 120° F. to about 160° F. Preferred are those having a melting point of at least 138/140° F.

Component (b) is a microcrystalline wax or, preferably, a mixture of two or more of such waxes. Microcrystalline waxes are obtained from heavy distillate oils or residual lubricating oils by well-known solvent precipitation procedures. The waxes are obtained from solvent solution by cooling the solution to a temperature range of about 40–60° F., the wax product melting at about 150–170° F. Conventional microcrystalline wax can be considered to be comprised of two components. A ceresin wax component is composed predominantly of normal and slightly branched paraffins, and has a melting point of the order of 180–200° F. The lower melting point plastic component, melting points being in the range of 150–180° F., is composed of highly branched and cyclic hydrocarbons.

When one microcrystalline wax is present in the compositions of this invention, it is preferred that it have a melting point of the order of 170° F. Outstanding results have been obtained with equal parts by weight of a 165–170° F. melting point, laminating grade of microcrystalline wax (A, hereinafter) and a 180° F. melting point, non-laminating grade of microcrystalline wax (B, hereinafter).

An interpolymer, (c), is present in the new compositions. This contains approximately 70–75 percent by weight of ethylene and the balance vinyl acetate. Typical of such a copolymer is one having an ethylene/vinyl acetate comonomer ratio of about 72/28 and a melt index of about 350, such as DQD 7268 made by Union Carbide Plastics. The melt index, indicative of molecular weight, should be greater than about 275 and less than about 450.

A normally solid polyethylene constitutes component (d). This should have an average molecular weight from about 1,000 to about 10,000 (number average). Advantageous is one having a molecular weight of about 1,500, such as Epolene N–10 a product of Eastman Chemical.

Component (e) is a polyterpene or mixture of polyterpenes. Typical, and preferred, is a polymer primarily of alpha-pinene; particularly, one having an average molecular weight of about 850, and sold by Newport Industries as Nirez 1115. Rosin-based esters such as pentaerythritol esters of rosin are also contemplated herein.

A polyisobutylene having an average molecular weight of from about 5,000 to about 15,000 (Staudinger method) comprises component (f). Representative materials are: a medium soft, low molecular weight polymer of 8,700–10,000 average molecular weight, marketed as Vistanex LMMS by Enjay; and a medium hard, low molecular weight polymer of 10,000–11,700 average molecular weight, similarly marketed as Vistanex LMMH.

As indicated above, the new compositions can contain a small amount of one or more wax-soluble, phenolic antioxidants. Particularly effective is 2,6-di-tertiarybutyl-p-cresol, marketed as Tenox BHT by Eastman Chemical. Another suitable antioxidant is a mixture of 2-tertiary-butyl-4-hydroxyanisole and 3-tertiarybutyl-4-hydroxyanisole, similarly marketed as Tenox BHA.

The superiority of the new compositions of this invention over related compositions and the unexpectedly outstanding properties thereof, are shown by seal strength and gloss retention tests. Also shown are viscosity values for several of the compositions.

Seal strength on glassine was determined by the technique described above.

Heat seal tests at −40° F. on carton stock were conducted by the following method. Strips of coated carton stock (15 point, clay-coated paperboard) were heat sealed on a Sentinel Heat Sealer at 250° F. at a dwell time of 1.5–4 seconds and a pressure of 30 pounds per square inch gauge. The sealed board was then stored at −40° F. for about 18 hours and was then delaminated by hand at −40° F. A zero (0) value indicates no adhesion of one board to another. A value of "1" signifies some adhesion (some resistance to a pulling force) of one board to another, but no fibre tear. Some fibre tear, less than about 50 percent of the total surface, is indicated by a value of "2". A value of "3" connotes: no separation of one board from another without fibre tear; expressed otherwise, substantially 100 percent fibre tear. An effective seal strength at such a low temperature is at least about 2.

Gloss stability was determined by noting the extent of material exuding from a carton coated with a composition after being maintained in an oven for 7 days at 105° F.

Test results are shown in Table 1 following.

TABLE 1

| Run No. | 1 | 2 | 3 | 4 | 5 | 6 | 7 | 8 | 9 | 10 | 11 |
|---|---|---|---|---|---|---|---|---|---|---|---|
| Composition: | | | | | | | | | | | |
| (a) Paraffin Wax, 138/140° F. | 100 | | | 90.0 | 97.5 | 97.5 | 85.0 | 70 | 50.0 | 60.0 | 50.0 |
| (b) Microcrystalline A | | 100 | | | | | | | 10.0 | 5.0 | 10.0 |
| (b) Microcrystalline B | | | 100 | | | | | | 10.0 | 5.0 | 10.0 |
| (c) Copolymer DQD 7268 | | | | | | | 15.0 | 30 | 15.0 | 15.0 | |
| (c) Copolymer Elvax 220 | | | | | | | | | | | 15.0 |
| (d) Polyethylene | | | | | | 2.5 | | | 2.5 | 2.5 | 2.5 |
| (e) Nirez 1115 | | | | 10.0 | | | | | 10.0 | 10.0 | 10.0 |
| (f) Vistanex LMMS | | | | | 2.5 | | | | 2.5 | 2.5 | 2.5 |
| Seal Strength on Glassine, g./in | 2 | 17 | 2 | 3 | 3 | 4 | 16 | 100 | 124 | 129 | 193 |
| Seal on Carton Stock at −40° F. | 0 | 0 | 0 | 0 | 0 | 0 | 1 | 1 | 3 | 1–2 | 0–1 |
| Viscosity of Blend at 250° F., csks | 3 | 11 | 10 | 4 | 4 | 4 | 65 | 350 | 113 | 98 | 200 |
| Gloss Stability of cartons—Exudation after 7 days at 105° F. | | | | | | | Massive | Massive | 0 | Massive | 0 |

Data given in Table 1 reveal that paraffin wax alone (Run No. 1) has little seal strength on glassine and none on carton stock at −40° F. Microcrystalline wax A alone (Run No. 2) exhibits some seal strength on glassine, but none at low temperatures. A value of less than 5 is indicative of little or no seal strength on glassine. Microcrystalline wax B alone (Run No. 3) has values similar to those of paraffin wax alone. Values for a blend of paraffin wax and polyterpene resin (Run No. 4) resemble those of Run Nos. 1 and 3. So also does paraffin wax with either polyisobutylene or polyethylene as shown by Run Nos. 5 and 6, respectively. Run No. 7 reveals that paraffin wax with Copolymer DQDA 7268 alone has improved seal strength on glassine and some carton seal at −40° F., but massive exudation. Run No. 8 illustrates the effect of the use of a large concentration of copolymer with no other additive being present; note the satisfactory strength, but excessive viscosity and massive exudation.

Unexpectedly, Run No. 9 demonstrates an unusual cooperative or synergistic behavior, as opposed to a mere additive effect, of components (a)–(f); the value for seal strength on glassine is 124 and the carton seal value is 3, yet the viscosity is well within accepted standards and gloss retention is excellent. Run Nos. 9 and 10 demonstrate that increase in paraffin wax content with a corresponding decrease in microcrystalline wax content, provides a slight gain in glassine seal strength and viscosity with undesirable loss in low temperature seal strength and gloss retention; this composition apparently contains insufficient microcrystalline wax. Run No. 11 indicates that a higher molecular weight copolymer cooperates to impart higher and unsatisfactory viscosity values and poor retention of seal at −40° F.

Although the compositions of this invention have been described as particularly well adapted for coating of butter and margarine cartons, it is to be understood that they are suitable for a wide variety of other uses. Paper or paperboard can be coated with the new compositions for use in the packaging of frozen foods, bacon, ice cream, and the like.

This invention has been described with reference to preferred compositions and components therefor. However, it is to be understood that departure from the preferred embodiments can be made within the scope of the specification and claims.

I claim:
1. A coating composition comprising in approximate percent by weight

| | |
|---|---|
| Paraffin wax | 32–62.5 |
| Microcrystalline wax | 15–25 |
| An interpolymer containing from about 70 to about 75 percent by weight of ethylene and from about 30 to about 25 percent by weight of vinyl acetate and having a melt index between about 275 and about 450 | 10–20 |
| A solid polymer of ethylene having a molecular weight of from about 1,000 to about 10,000 | 1–4 |
| A polyterpene resin | 7.5–15 |
| and | |
| A polyisobutylene having a molecular weight of from about 5,000 to about 15,000 | 1–4 |

2. A composition as defined by claim 1 wherein the paraffin wax has a melting point of about 140° F.
3. A composition as defined by claim 1 wherein the microcrystalline wax has a melting point of about 165° F.
4. A composition as defined by claim 1 wherein the microcrystalline wax comprises a mixture of one having a melting point of about 165° F., and another having a melting point of about 180° F.
5. A composition as defined by claim 1 wherein the interpolymer has a comonomer ratio, weight percent, ethylene/vinyl acetate of about 72/28, and a melt index of about 350.
6. A composition as defined by claim 1 wherein the ethylene polymer has an average molecular weight of about 1,500.
7. A composition as defined by claim 1 wherein the polyterpene resin is a polymer primarily of alpha-pinene.
8. A composition as defined by claim 1 wherein the polyterpene resin is a polymer of aplha pinene having a molecular weight of about 850.
9. A composition as defined by claim 1 wherein the polyisobutylene has an average molecular weight ranging from about 8,700 to about 10,000.
10. A composition as defined by claim 1 containing a minor amount of a petroleum-wax soluble, phenolic antioxidant.
11. A composition as defined by claim 1 containing a small amount of 2,6-di-tertiarybutyl-p-cresol.
12. A coating cmposition as defined by claim 1 containing from about 10 to about 500 parts per million of a wax-soluble, phenolic antioxidant.
13. A coating composition comprising in approximate percent by weight

| | |
|---|---|
| Paraffin wax, 138/140° F., M.P. | 50 |
| Microcrystalline wax, 165–170° F., M.P. | 10 |
| Microcrystalline wax, 180° F., M.P. | 10 |
| An interpolymer having a comonomer ratio, weight percent, ethylene/vinyl acetate of about 72/28, and a melt index of about 350 | 15 |
| A solid ethylene polymer having a molecular weight of about 1,500 | 2.5 |
| A polyisobutylene having an average molecular weight ranging from about 8,700 to about 10,000 | 2.5 |
| and | |
| An alpha-pinene polymer having a molecular weight of about 850 | 10 |

14. A coating composition as defined by claim 1 containing about 25 parts per million of 2,6-di-tertiarybutyl-p-cresol.
15. A composition as defined by claim 1 wherein the paraffin wax has a melting point from about 120° F. to about 160° F.
16. A composition as defined by claim 1 wherein the microcrystalline wax has a melting point from about 150° F. to about 200° F.

References Cited

UNITED STATES PATENTS

| | | | |
|---|---|---|---|
| 3,046,238 | 7/1962 | Ridenour | 260—28.5 |
| 3,048,553 | 8/1962 | Moss | 260—28.5 |
| 3,146,214 | 8/1964 | Jakaitis et al. | 260—28.5 |
| 3,175,986 | 3/1965 | Apikos et al. | 260—28.5 |
| 3,205,186 | 9/1965 | Zaayenga | 260—28.5 |
| 3,245,930 | 4/1966 | McDowell et al. | 260—28.5 |

MORRIS LIEBMAN, *Primary Examiner.*

B. A. AMERNICK, *Assistant Examiner.*